United States Patent [19]

Jonsson

[11] Patent Number: 4,854,854

[45] Date of Patent: Aug. 8, 1989

[54] FLUIDIZED BED FUEL-FIRED POWER PLANT

[75] Inventor: Arne Jonsson, Finspong, Sweden

[73] Assignee: ABB Stal AB, Sweden

[21] Appl. No.: 190,844

[22] Filed: May 6, 1988

[51] Int. Cl.$^4$ ............................................. F23D 19/02
[52] U.S. Cl. .................................... 431/170; 110/245; 432/58
[58] Field of Search .................... 431/7, 170; 110/245, 110/263; 432/58; 122/4 D; 126/163 R, 163 A

[56] References Cited

U.S. PATENT DOCUMENTS

| | | | |
|---|---|---|---|
| 3,096,104 | 7/1963 | Browning | 285/226 |
| 4,268,244 | 5/1981 | Dawson | 431/170 |
| 4,402,665 | 9/1983 | Korenberg | 431/170 |
| 4,646,661 | 3/1987 | Roos et al. | 431/170 X |

FOREIGN PATENT DOCUMENTS

| | | |
|---|---|---|
| 277623 | 12/1913 | Austria. |
| 3527825 | 2/1987 | Fed. Rep. of Germany ...... 431/170 |
| 1149105 | 4/1983 | U.S.S.R. . |

Primary Examiner—Margaret A. Focarino

[57] ABSTRACT

A fuel burning power plant comprises a bed vessel with a bottom grate which divides the bed vessel into an upper combustion chamber and a lower part with at least one ash chamber. The bed grate consists of parallel air distribution tubes each with air nozzles, between which tubes gaps are provided where bed material may pass from the combustion chamber down to the ash chamber. Below the tubes there is a transverse air distribution chamber. The tubes are connected in groups to the air distribution chamber by a double-walled sleeve extending down from the tubes.

9 Claims, 6 Drawing Sheets

FLUIDIZED BED FUEL-FIRED POWER PLANT

TECHNICAL FIELD

The present invention relates to a power plant for burning fuel in a fluidized bed of particulate material. The invention is applicable to plants in which the combustion is performed at atmospheric pressure and also to plants operating at a pressure considerably exceeding the atmospheric pressure, for example in a Pressurized Fluidized Bed Combustion (PFBC) power plant with a combustion chamber located inside a pressure vessel and surrounded by compressed combustion air in the space between the pressure vessel and the bed vessel.

BACKGROUND ART AND THE TECHNICAL PROBLEM

In fluidized bed combustion plants with a bed vessel having a grate at the bottom of the bed which includes parallel air distribution tubes and a combustion chamber above the grate and one or more ash chambers with cooled walls below the grate, allowing for the temperature differences arising between the ash chamber and the air distribution tubes, involves constructive problems due to the different thermal expansions of the different structural members. The temperature differences arising in the bed are particularly great during start-up of the plant when combustion gases from a start-up combustion chamber at a temperature of 800°–900° C. are injected through the distribution tubes of the grate for heating the bed material to the auto-ignition temperature of the fuel being used.

In a power plant of the above-described kind, (for example as described in the specification of U.S. Pat. No. 4,268,244) a number of air distribution tubes of circular cross-section are connected individually to an air distribution chamber, which is arranged at right angles to the tubes, by a connecting tube. In an embodiment of the kind shown in U.S. Pat. No. 4,268,244 which is provided with a sufficient crosssection of the air distribution tubes and a suitable distance between these for satisfactory fluidization of the bed and good combustion of fuel, the distance between the air distribution tubes will be small and the gap unsatisfactorily narrow. Slag lumps which form during combustion of the fuel are unable to pass down to the ash chamber(s) below the tubes and the combustion process is thus disturbed. If the slag cannot be cleared during combustion the operation of the plant will eventually have to be interrupted.

SUMMARY OF THE INVENTION

According to the invention, the grate defining the bottom of a fluidized bed in a bed vessel is provided with air distribution tubes with a considerably greater vertical height dimension than width. The ratio of height to width in each air distribution tube should be greater than 2:1, suitably greater than 3:1. In this embodiment a sufficiently wide gap can be provided between the air distribution tubes to prevent slag formation build up in the bed, while still obtaining good fluidization and combustion conditions in the bed. Gap widths of 40 mm can be obtained without difficulty and this width is sufficient to clear minor slag lumps from the bed. For cooling material entering the ash chamber by injecting combustion air into it, the gaps between the air distribution tubes should desirably present a large area since this reduces the risk of the ash cooling air causing fluidization of the material in the gaps.

The cross-sectional area of a circular cylindrical connecting tube between an air distribution tube and a supply air distribution chamber is insufficient for the air quantity in question. A high air speed results in an undesired pressure drop and energy loss. Rectangular connection conduits can have larger cross-sectional area than circular ones but involve design difficulties, especially in view of the thermal stresses caused by the different expansions of the different structural members. By connecting pluralities of air distribution tubes together in groups to the air distribution chamber by means of a cylindrical connection conduit, constructed as a socalled thermo-sleeve, a sufficiently large cross-sectional flow area and sufficient possibilities for movement between plant components which are heated to different degrees can be obtained. By connection "in groups" is meant that at least two air distribution tubes are connected to the air distribution chamber by a common connection conduit. The thermo-sleeve may be built up of two concentric sleeves. The inner sleeve is connected at its upper end to the air distribution tubes. The lower ends of the two sleeves are joined together and the outer sleeve is connected at its upper end to an upper wall in the transversely extending air distribution channel. Both sleeves suitably have circular cross-section.

The bed vessel is suitably formed with two parallel ash chambers in which case the air distribution chamber can be located between the ash chambers, the walls of the ash chambers constituting the side walls of the air distribution chamber.

In a preferred embodiment of the invention, a first vertical duct is located below the air distribution chamber, at least one start-up combustion chamber for preheating the bed is arranged in the lower part of said first vertical duct, a second vertical duct, forming an outlet from the start-up combustion chamber, is located inside the first vertical duct, a wall is provided between the said vertical ducts dividing an annular space between the said vertical ducts into an upper surface and a lower space, the said upper and lower spaces between the ducts communicate with a compressed air source both above and below said wall and an air valve is located in the connection between the compressed air source and the upper space.

BRIEF DESCRIPTION OF THE DRAWINGS

The invention will now be described in greater detail, by way of example, with reference to the accompanying drawings, wherein FIGS. 1 and 2 schematically show a PFBC power plant in two planes perpendicular to each other.

DESCRIPTION OF THE PREFERRED EMBODIMENT

Figure 1:
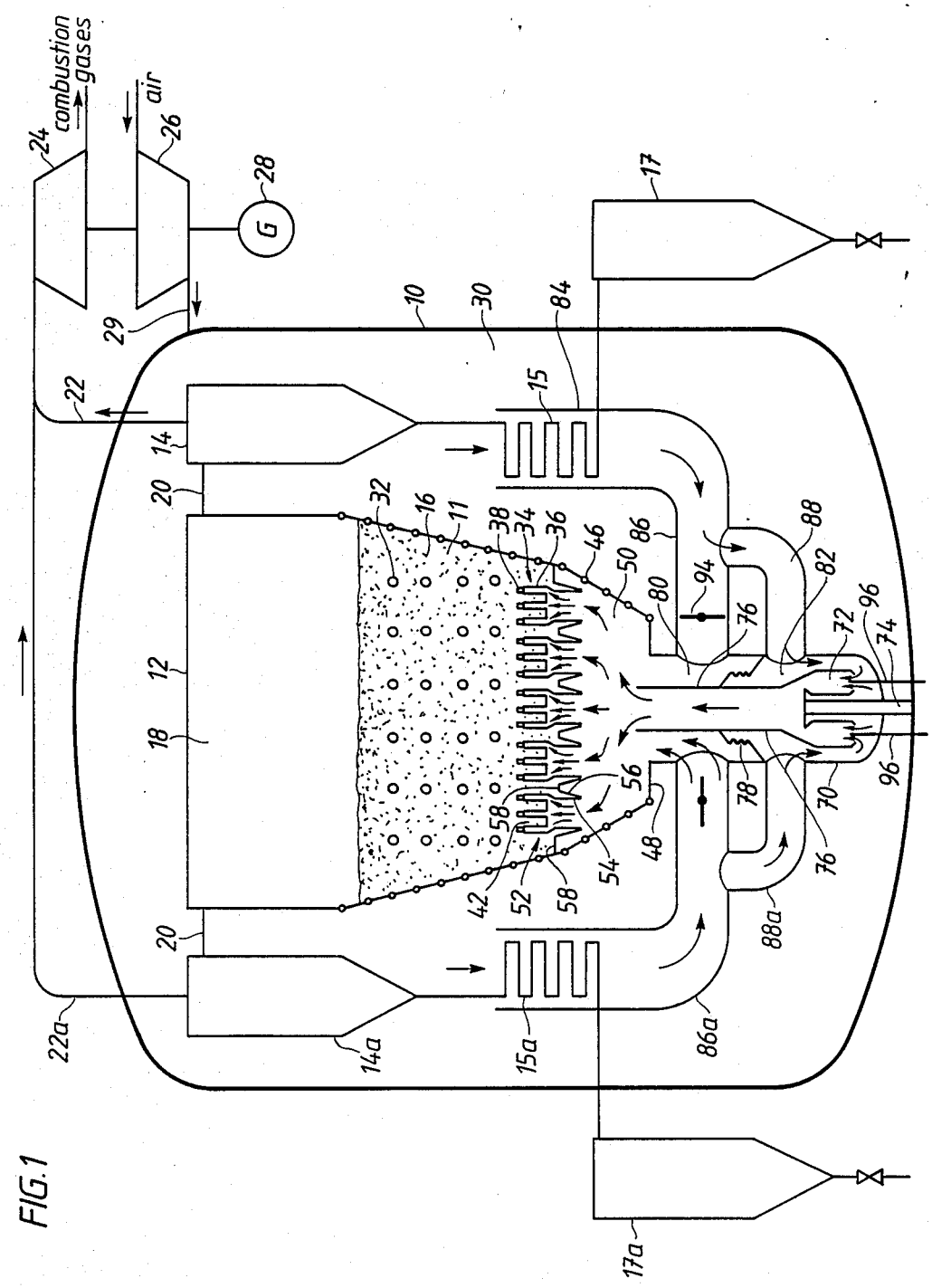

In the drawings, the numeral 10 designates a pressure vessel. A bed vessel 12 is located in the pressure vessel and a cleaning plant with cyclones 14 for separation of dust from combustion gases generated upon combustion of a fuel in a fluidized bed 16, which is located in a combustion chamber 11 of the bed vessel 12. The combustion gases collected in a freeboard 18, are passed in conduits 20 to the cyclones 14 and flow therefrom through conduits 22 to a gas turbine 24. Several groups of series-connected cyclones 14 would normally be provided but these are not shown in the drawings.

The turbine 24 drives a compressor 26 and an electrical generator 28. Combustion air compressed in the compressor 24 is supplied through a conduit 29 to a space 30 in the pressure vessel 10. In the bed vessel 12 there are tubes 32 for generation of steam to a steam turbine (not shown) and for cooling the bed 16. Dust separated in the cyclones 14 is transported away through pressure-reducing discharge devices 15 and is collected in a container 17.

The bed vessel 12 is provided with a grate 34 consisting of a plurality of spaced-apart elongated air distribution tubes 36 each provided with a plurality of fluidization nozzles 38. The grate 34 divides the bed vessel 12 into an upper part which includes the combustion chamber 11 and the freeboard 18 and a lower part which defines two parallel ash chambers 40. Material from the bed 16 is able to pass down into the ash chambers 40 through gaps 42 between the air distribution tubes 36. Air for cooling the material in the ash chambers 40 may be introduced through tubes 41 with nozzles 43. Air withdrawn directly from the space 30 can be utilized as a coolant.

Figure 2:
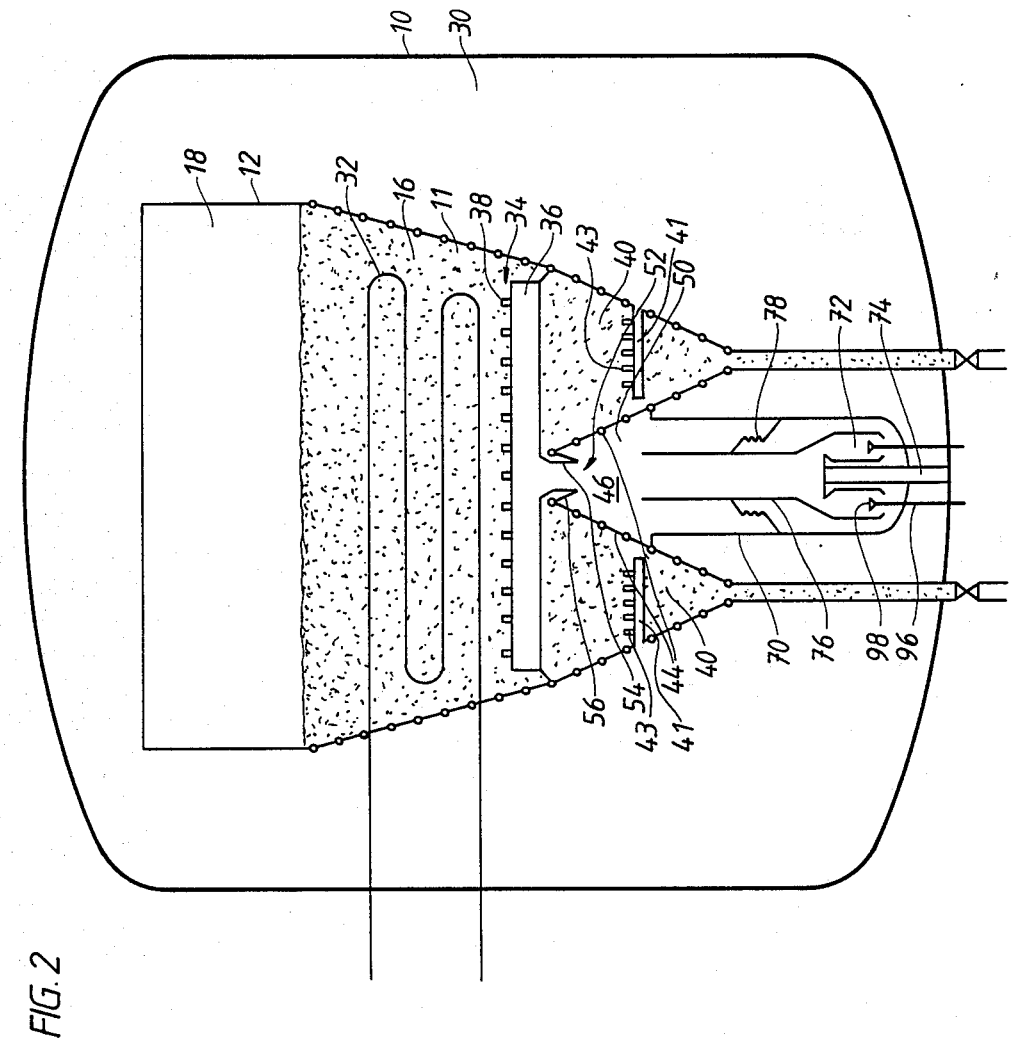

Inner side walls 44 (FIG. 2) of the ash chambers 40, walls 46 extending between the side walls, and lower and upper horizontal walls 48 and 58 form an air distribution or plenum chamber 50. From this chamber 50 the air distribution tubes 36 are individually supplied, or as shown in the Figures groups of three air distribution tubes 36 are supplied with combustion air through a respective downwardly extending double-walled connection tube or thermo-sleeve) 52. Each thermo-sleeve has an inner sleeve 54 and an outer sleeve 56, the inner sleeve 54 being connected to the three air distribution tubes 36. The inner sleeve 54 and the outer sleeve 56 are joined to each other at their lower ends and the upper end of the outer sleeve 56 is connected to the upper horizontal wall 58 which defines the top of the chamber 50.

Figure 3:
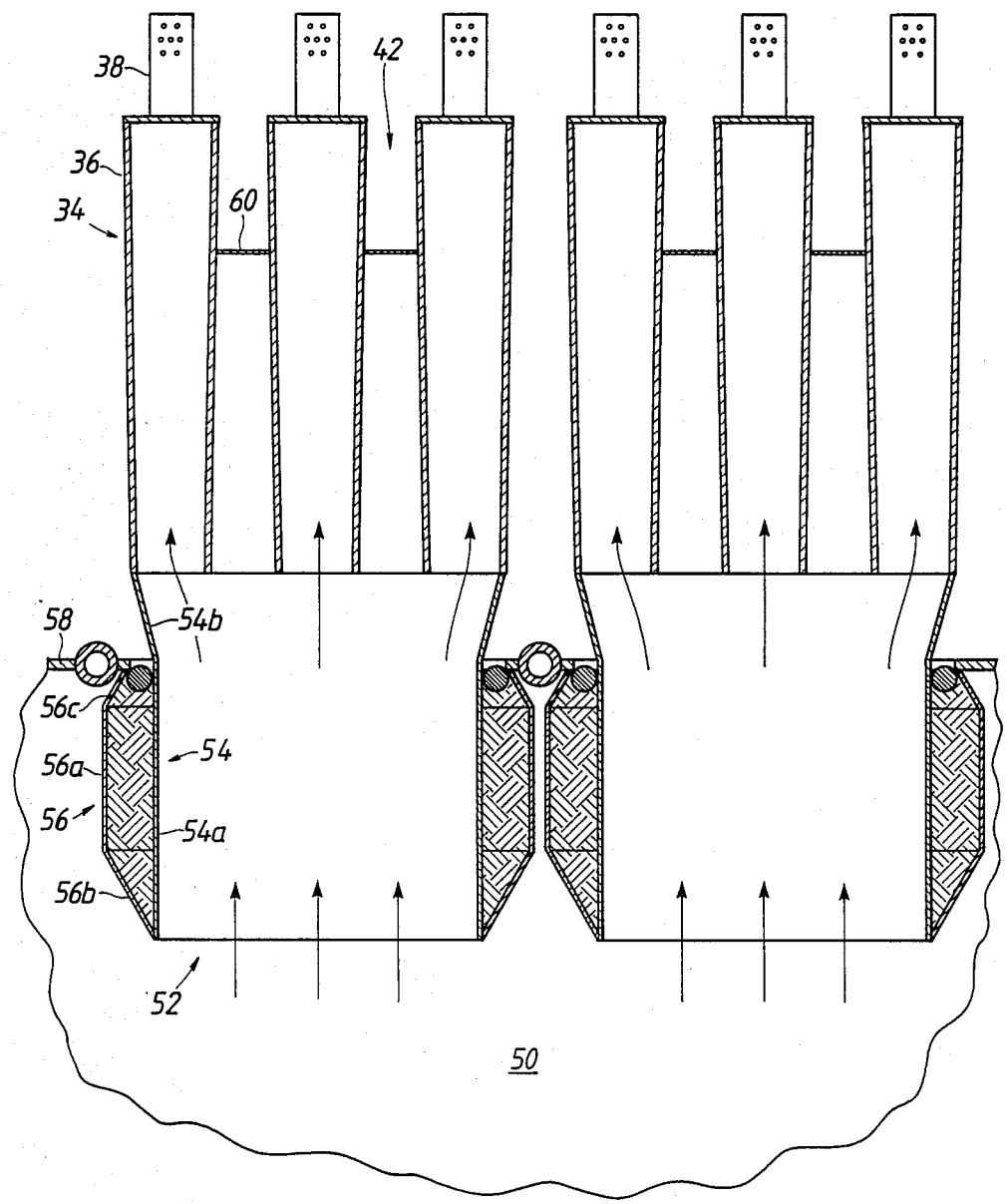
FIGS. 3 and 4 show, on an enlarged scale, the connection between the air distribution chamber and elongated air distribution tubes provided with fluidization nozzles, forming a grate for the bottom of the fluidized bed.
Figure 4:
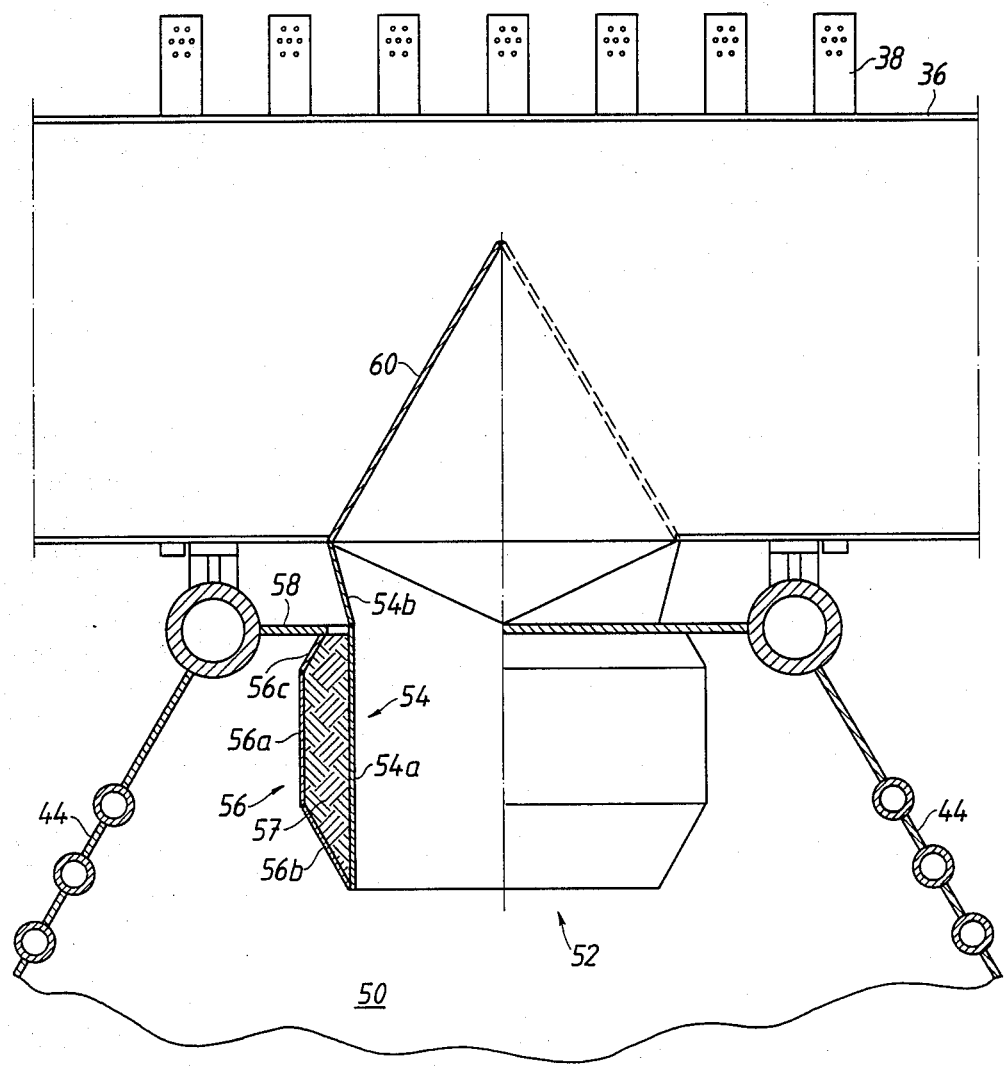
Figure 5:
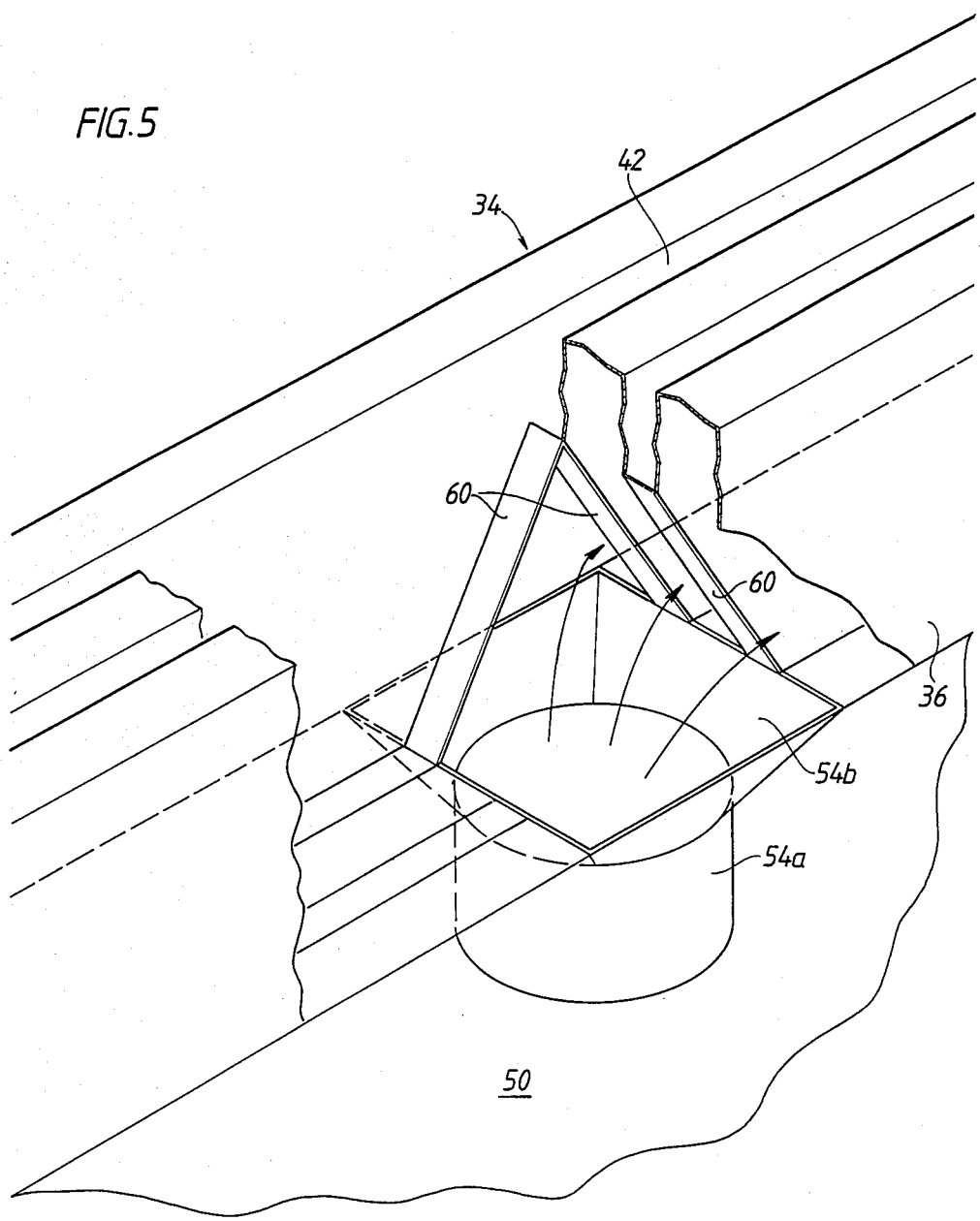
FIG. 5 is a perspective view which also shows the connection between the air distribution chamber and the air distribution tubes.

As shown in FIGS. 3, 4 and 5, the inner sleeve 54 of each thermo-sleeve 52 consists of a lower cylindrical part 54a and a tunnel-like transition part 54b which connects the sleeve 54 to the respective three air distribution tubes 36. The outer sleeve 56 consists of a central cylindrical part 56a, a lower frusto-conical part 56b, which is joined to the lower cylindrical part 54a of the inner sleeve 54, and an upper frusto-conical part 56c, which is connected to the upper horizontal wall 58. Between the air distribution tubes 36, inclined sheets 60 are located which form a roof over the thermo-sleeve 52 and define that space above the open upper end of the thermosleeve 52 which is separated from the space with the bed 16. A thermal insulating material 57 can be located between the sleeves 54 and 56.

Below the bed vessel 12 there is a vertical duct 70 which is closed at the bottom and which opens out at the top into the air distribution chamber 50. The duct 70 is connected to the lower horizontal wall 48 of the air distribution chamber 50. At the lower part of the duct 70 there are a number of start-up combustion chambers 72 which are supported by a column 74. These start-up combustion chambers 72 are connected to their outlet side to an inner duct 76. Between the ducts 70 and 76 there is a horizontal wall 78 which divides the annular space between the ducts 70 and 76 into an upper space 80 and a lower space 82. The spaces 80 and 82 communicate with the space 30 containing compressed combustion air through a duct 84 (FIG. 1) and conduits 86 and 88. In the duct 84 the pressure reducing ash discharge device 15 is arranged and acts as an ash cooler for cooling ashes on the way to the receiving container 17. In the air conduit 86 there is a valve 94. The startup combustion chambers 72 are supplied with fuel, (for example gas or oil through conduits 96 and burners 98.

Figure 6:
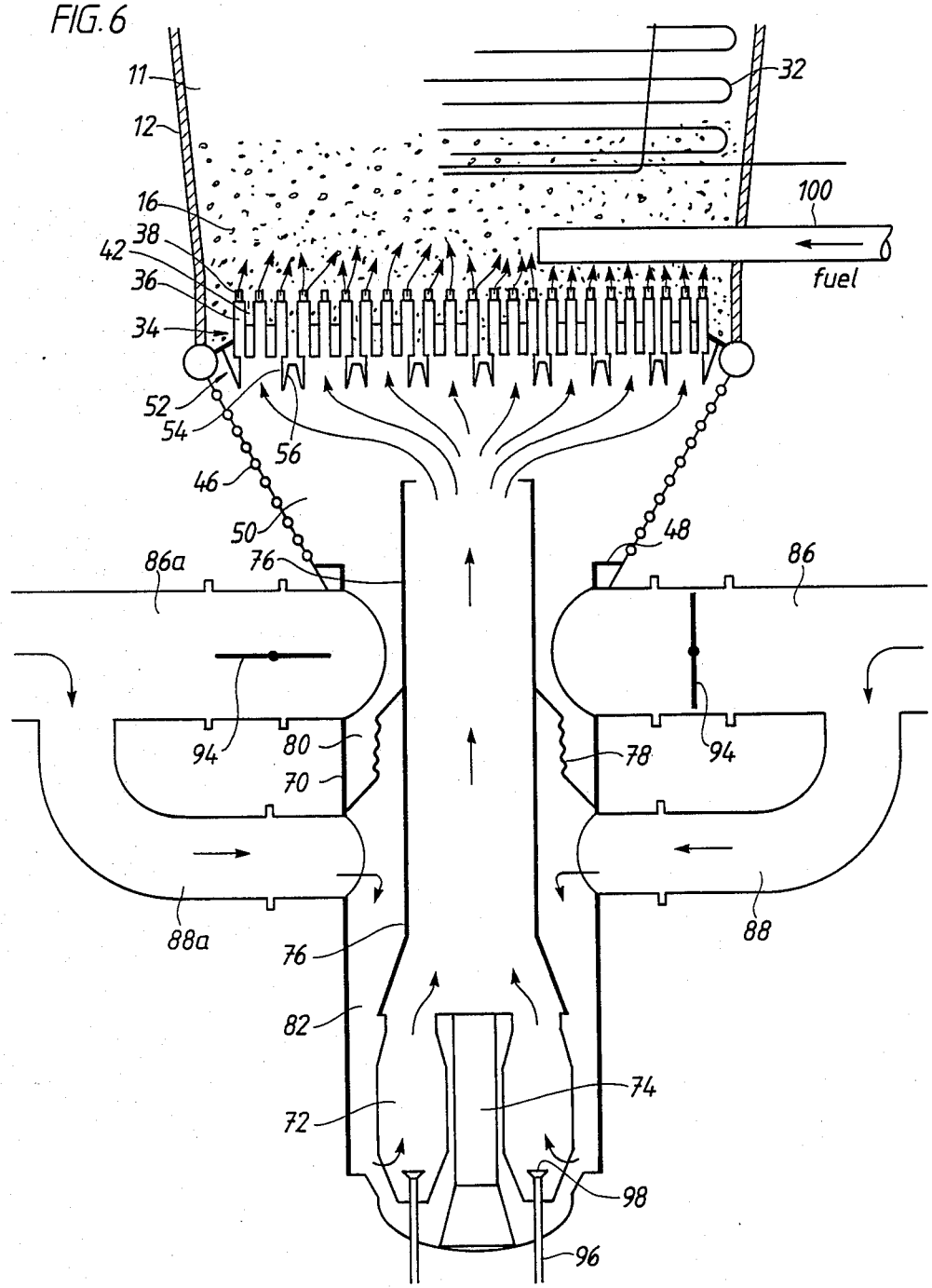
FIG. 6 shows on an enlarged scale a schematic view of the lower part of the bed vessel with air distribution chamber and start-up combustion chamber in the same section as in FIG. 1.

Upon start-up of the plant, air supply to the space 80 is prevented by the valve 94 in the conduit 86 being in the closed position as shown to the right in FIG. 1 and in FIG. 6. Combustion air flowing in the conduit 86 is directed to the space 82 and thus into the start-up combustion chambers 72. The combustion chambers are supplied with fuel through the conduits 96 and the hot combustion gases are led through the inner duct 76 to the air distribution chamber 50 and is distributed therein to the air distribution tubes 36 through the thermo-sleeves 52. From the air distribution tubes 36 and the nozzles 38 the hot gas flows into the bed 16. When the bed 16 has reached a temperature sufficiently high for ignition of the selected fuel, such as coal, the valve 94 is opened and the bed 16 is supplied with the fuel through a fuel pipe 100 (shown in FIG. 6). The fuel supply to the start-up combustion chambers 72 can now be stopped. Combustion air is now supplied to the air distribution chamber 50 directly, partly through the conduit 86 and the space 80 and partly through the conduit 88, the start-up combustion chambers 72 and the duct 76.

Upon start-up of the plant the temperature differences arising between different structural members can be expected to be very large. Because of the construction of the thermo-sleeves 52, each with an inner sleeve 54 and an outer sleeve 56, the structural members included in the bed vessel may expand to differing degrees without impermissible stresses arising.

FIG. 6 shows two conduits 86, 86a and 88, 88a and in practice two or more may be needed for optimal performance. There can also be a doubling up of cyclones, an ash discharge device, and an ash receiving container and these are also shown in FIG. 1 with the suffix "a".

What is claimed is:

1. A power plant for burning fuel in a fluidized bed of a particulate material, comprising:
 a bed vessel;
 a plurality of parallel spaced-apart air distribution tubes with nozzles spaced apart along each tube, said tubes defining a grate with gaps therein, said grate dividing said bed vessel into an upper part with a combustion space containing the fluidized bed and a lower part forming at least two ash chambers into which ashes and consumed bed material pass through said gaps in said grate;
 an air plenum chamber for supplying combustion air to said air distribution tubes, said air plenum chamber being located below said grate, between said ash chambers and transversely to said air distribution tubes; and at least one thermal sleeve provided between said grate and said air plenum chamber, said sleeve connecting a group of at least two air distribution tubes with said air plenum chamber.

2. A power plant according to claim 1, wherein each air distribution tube has a substantially rectangular crosssection, the ratio of the height to the width of each said tube being greater than 2:1.

3. A power plant according to claim 2, wherein said ratio is greater than 3:1.

4. A power plant according to claim 1, wherein said thermal sleeve comprises an inner sleeve and an outer sleeve, said inner sleeve being connected to at least two air distribution tubes at its upper end, said inner and outer sleeves being connected to each other at their lower ends, and the outer sleeve being connected to a wall of the air plenum chamber at its upper end.

5. A power plant according to claim 2, wherein said thermal sleeve comprises an inner sleeve and an outer sleeve, said inner sleeve being connected to at least two air distribution tubes at its upper end, said inner and outer sleeves being connected to each other at their lower ends, and said outer sleeve being connected to a wall of the air plenum chamber at its upper end.

6. A power plant according to claim 4, wherein said thermal sleeve is formed with a transition part having a rectangular cross-section at the point of its connection to said air distribution tubes.

7. A power plant according to claim 5, wherein said thermal sleeve is formed with a transition part having a rectangular cross-section at the point of its connection to said air distribution tubes.

8. A power plant according to claim 1, wherein a first vertical duct is located below said air plenum chamber, at least one start-up combustion chamber for pre-heating the bed is arranged in a lower part of said first vertical duct, a second vertical duct, forming an outlet from said start-up combustion chamber, is located inside said first vertical duct, a wall is provided between said vertical ducts dividing an annular space between said vertical ducts into an upper space and a lower space, said upper and lower spaces between the ducts connect to a compressed air source both above and below said wall and an air valve is located in the connection between the compressed air source and said upper space.

9. In the construction of an air distribution grate in a fluidized bed combustion chamber in which said grate is formed from parallel spaced-apart air distribution tubes, each feeding a plurality of spaced-apart air outlet nozzles, said tubes being fed with air from an underlying walled air plenum chamber, a double-walled air inlet sleeve provided between said air plenum chamber and groups of air distribution tubes, said sleeve including an inner wall and an outer wall, said inner wall being connected at its upper end to said air distribution tube and at its lower end to the outer wall, and the upper end of said outer wall being connected to a wall of said air plenum chamber.

* * * * *